Patented June 27, 1950

2,512,845

UNITED STATES PATENT OFFICE 2,512,845

MONOAZO-DYESTUFFS

Willy Widmer, Bottmingen, and Emil Mannhart, Riehen, Switzerland, assignors to Ciba Limited, Basel, Switzerland, a Swiss firm No Drawing. Application June 24, 1947, Serial No. 756,809. In Switzerland July 15, 1946

3 Claims. (Cl. 260—200)

According to this invention valuable new mono-azo-dyestuffs are made by coupling an ortho-hydroxy-diazo-compound of the benzene series containing a sulfonic acid group with a coupling component of the general formula

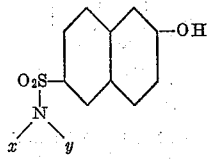

in which $x$ represents an aryl, aralkyl, cycloalkyl or alkyl radical, and $y$ represents hydrogen or an alkyl radical, and, if desired, treating the resulting dyestuff with an agent yielding metal.

In this invention it is generally desirable so to select the starting materials that the dyestuff molecule contains only one sulfonic acid group. It is also generally of advantage to use diazo-components and coupling components which are free from —COOH-groups.

The ortho-hydroxy-diazo-compounds of the benzene series used as starting materials may, for example, be free from further substituents or may contain substituents, principally substituents of the kind incapable of forming salts, for example, a single substituent of that kind. As substituents of this kind there may be mentioned, for example, halogen atoms especially chlorine atoms, nitro groups, alkly groups such as ethyl and methyl groups, alkoxy groups such as methoxy groups, and the like. As examples of ortho-hydroxy-diazo-compounds which come into consideration as starting materials there may be mentioned the diazo-compounds of 2-amino-1-phenol-4:6-disulfonic acid, 4-methyl-2-amino-1-phenol-6-sulfonic acid, 4-nitro-2-amino-1-phenol-6-sulfonic acid and 6-nitro-2-amino-1-phenol-4-sulfonic acid. Especially good results can be obtained with diazocompounds of 2-amino-1-phenol monosulfonic acids which are free from further substituents, such as 2-amino-1-phenol-4-sulfonic acid, and principally with diazo-compounds of chloro-2-amino-1-phenol monosulfonic acids such as 4-chloro-2-amino-1-phenol-6-sulfonic acid or 6-chloro-2-amino-1-phenol-4-sulfonic acid. The ortho-hydroxy-diazo-compounds may be prepared from the amines by methods in themselves known, for example, by liberating the ortho-aminophenol sulfonic acid from an aqueous solution of an alkali salt thereof by means of an excess of a mineral acid and the addition of sodium nitrite.

In the coupling components of the above general formula used in the present invention $x$ may be an aryl radical, for example, a benzene residue; an aralkyl radical for example, a benzyl radical; a cycloalkyl radical, for example, a cyclohexyl radical; or an alkyl radical such, for example, as a methyl, ethyl, propyl, butyl or amyl radical, in which case branched alkyl radicals, for example, isobutyl, isoamyl or tertiary amyl radicals, also come into consideration. The symbol $y$ may represent hydrogen or an alkyl radical, for example, an alkyl radical of the kind mentioned in the case of $x$. Coupling components giving good results are, for example, those in which $x$ is a benzene residue and $y$ hydrogen or an alkyl radical, for example, methyl. In this case the benzene residue may contain further substituents, advantageously those incapable of forming salts, for example, halogen atoms especially chlorine atoms, or alkyl groups such as ethyl, or methyl groups, or alkoxy groups such as ethoxy or methoxy groups. Good results are also obtained with compounds of the above formula, when $x$ and $y$ each represent an alkyl group, the two alkyl groups being the same (for example, two ethyl or butyl groups) or different (for example, an ethyl and a methyl group).

The coupling components used in the invention as starting materials can generally be made in a simple manner from 2-hydroxy-naphthalene-6-sulfonic acid chloride and a primary (when $y$ represents hydrogen) or secondary (when $y$ represents an alkyl radical) amine with the aid of an acid-binding agent (for example, sodium carbonate or a tertiary amine such as pyridine) in an aqueous or anhydrous medium. These compounds can easily be obtained in a pure state by crystallization from a suitable solvent, for example, aqueous ethyl alcohol.

As examples of coupling components, which lead to good results in the present invention, there may be mentioned the following:

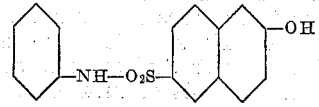

2-hydroxynaphthalene-6-sulfonic acid anilide

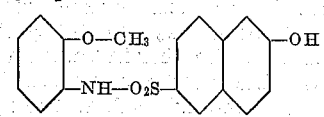

2-hydroxynaphthalene-6-sulfonic acid ortho-anisidide

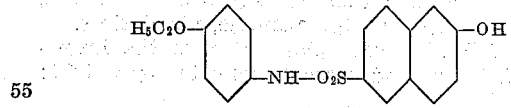

2-hydroxynaphthalene-6-sulfonic acid para-phenetidide

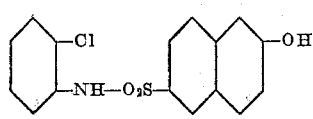

2-hydroxynaphthalene-6-sulfonic acid
ortho-chloranilide

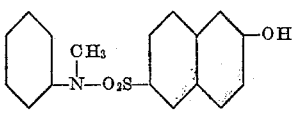

2-hydroxynaphthalene-6-sulfonic acid
N-methylanilide

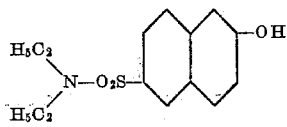

2-hydroxynaphthalene-6-sulfonic acid
diethylamide

The coupling of the azo-components with the ortho-hydroxy-diazo-compounds may be carried out in a manner in itself known, advantageously in an alkaline medium, for example a medium rendered alkaline with an alkali carbonate.

From the foregoing description it will be apparent that the new dyestuffs correspond to the general formula

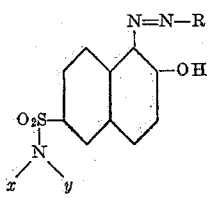

in which R represents a benzene nucleus which contains in ortho-position with respect to the azo-linkage a hydroxyl group and as a further substituent at least one sulfonic acid group, and in which $x$ represents an aryl, aralkyl, cycloalkyl or alkyl radical and $y$ represents hydrogen or an alkyl radical.

These new products can be used for dyeing or printing various fibers, principally, however, those of animal origin such as wool, silk or leather. Especially valuable results are obtained by treating the dyestuffs obtainable by the invention with an agent yielding metal. This treatment may be carried out in a manner in itself known in substance, in the dyebath, or on the fibers. Thus, the metallization may take place in substance, for example, with an agent yielding chromium, in an acid, neutral or alkaline medium and in the presence or absence of suitable additions such as acids, neutral salts or bases, if desired, with the use of an acid-binding agent, organic solvents or further additions, assisting the formation of the complex, and under atmospheric or superatmospheric pressure.

The metallization may also be carried out in the dyebath or on the fiber in known manner, for example, with the addition of a neutral chromate as well as an ammonium salt to the dyebath, or by known after-chroming methods. There are obtained by the invention, among others, dyestuffs which dye wool by the usual chroming processes very fast, for example, violet tints.

The following examples illustrate the invention, the parts and percentages being by weight:

*Example 1*

18.9 parts of 2-amino-1-phenol-4-sulfonic acid are diazotized in known manner, and the neutralized diazo solution is coupled with a solution consisting of 29.4 parts of 2-hydroxy-naphthalene-6-sulfonic acid diethylamide, 5 parts of sodium hydroxide and 250 parts of water at 3° C. When the coupling has ceased the resulting dyestuff is completely precipitated by the addition of sodium chloride, separated by filtering, and dried. It is a violet-black powder which dissolves in water with a bordeaux red coloration, and in dilute caustic soda solution and in concentrated sulfuric acid with an orange-red coloration. The dyestuff corresponds to the formula

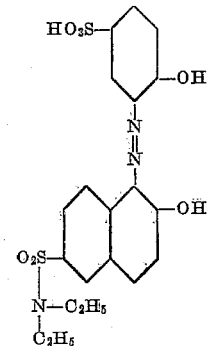

and dyes wool from an acid bath red tints, which when after-chromed become bluish bordeaux tints fast to light, fulling and potting.

A similar dyestuff is obtained by using 2-hydroxy-naphthalene-6-sulfonic acid anilide as the azo-component, instead of 2-hydroxynaphthalene-6-sulfonic acid diethylamide.

*Example 2*

20.3 parts of 4-methyl-2-amino-1-phenol-5-sulfonic acid are diazotized in known manner, and the neutralized diazo-solution is coupled with a solution of 36 parts of 2-hydroxy-naphthalene-6-sulfonic acid para-phenetidide and 10 parts of sodium hydroxide in 250 parts of water at 3° C. When the coupling has ceased, the resulting dyestuff is completely precipitated by the addition of sodium chloride, separated by filtering with suction, and dried. It is a violet-black powder which dissolves in water with a bordeaux red coloration and in dilute caustic soda solution with red coloration and in concentrated sulfuric acid with a bluish red coloration. The dyestuff corresponds to the formula

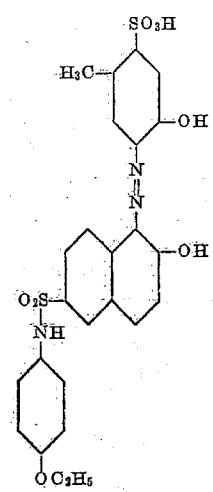

and dyes wool from an acid bath red tints, which when after-chromed become violet tints fast to light and fulling.

A similar dyestuff is obtained by using 2-hydroxynaphthalene-6-sulfonic acid ortho-anisidide, instead of 2-hydroxynaphthalene-6-sulfonic acid para-phenetidide.

*Example 3*

22.3 parts of 4-chloro-2-amino-1-phenol-6-sulfonic acid are diazotized in known manner, and the neutralized diazo-solution is coupled with a solution of 31.4 parts of 2-hydroxynaphthalene-6-sulfonic acid anilide, 10 parts of sodium hydroxide and 250 parts of water. When the coupling has ceased the resulting dyestuff is completely precipitated by the addition of sodium chloride, separated by filtration and dried. It is a violet-black powder which dissolves in water with a violet coloration and in dilute caustic soda solution and in concentrated sulfuric acid with a red coloration. The dyestuff corresponds to the formula

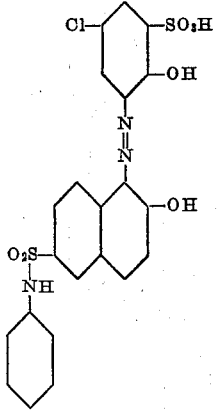

and dyes wool from an acid bath brown tints which when after-chromed become blue-violet tints of excellent fastness to light, fulling and potting. The dyestuff is excellently suited for dyeing wool by the one-bath chroming process, in which case fast violet-blue dyeings are also obtained.

Dyestuffs having similar properties are obtained by using, instead of 2-hydroxynaphthalene-6-sulfonic acid anilide, as an azo component, one of the following compounds: 2-hydroxynaphthalene-6-sulfonic acid ortho-anisidide, 2-hydroxynaphthalene-6-sulfonic acid para-phenetidide, 2-hydroxynaphthalene-6-sulfonic acid N-methyl-anilide, and 2-hydroxynaphthalene-6-sulfonic acid diethylamide.

In the case of the 2-hydroxynaphthalene-6-sulfonic acid N-methyl-anilide, the dyestuff corresponds to the formula

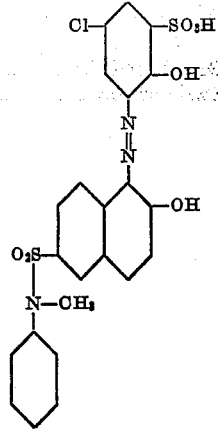

The appended claims are directed to the dyestuffs of the present example.

*Example 4*

23.4 parts of 4-nitro-2-amino-1-phenol-6-sulfonic acid are diazotized in known manner, and the neutralized diazo-solution is coupled with a solution of 34.4 parts of 2-hydroxynaphthalene-6-sulfonic acid N-methyl-anilide, 5 parts of sodium hydroxide and 250 parts of water at 3° C. When the coupling has ceased the resulting dyestuff is completely precipitated by the addition of sodium chloride, separated by filtration, and dried. It is a violet-black powder which dissolves in water with a bordeaux red coloration and in dilute caustic soda solution and in concentrated sulfuric acid with an orange red-coloration. The dyestuff corresponds to the formula

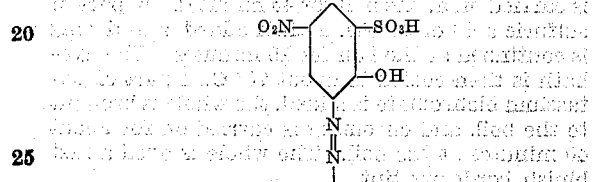

and dyes wool from an acid bath violet tints which when after-chromed become violet-brown tints which are fast to light and fulling. The dyestuff is also suitable for dyeing wool by the one-bath chroming process, in which case fast violet-brown dyeings are also obtained.

*Example 5*

23.4 parts of 6-nitro-2-amino-1-phenol-4-sulfonic acid are diazotized in known manner, and the neutralized diazo solution is coupled with a solution of 34.6 parts of 2-hydroxynaphthalene-6-sulfonic acid ortho-anisidide, 10 parts of sodium hydroxide and 250 parts of water at 3° C. When the coupling has ceased the resulting dyestuff is completely precipitated by the addition of sodium chloride, separated by filtration, and dried. It is a violet-black powder which dissolves in water with a violet coloration, in dilute caustic soda solution with a bordeaux red coloration and in concentrated sulfuric acid with a red coloration. The dyestuff corresponds to the formula

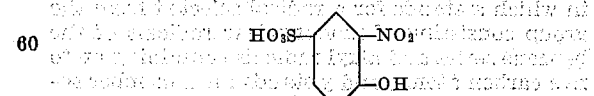

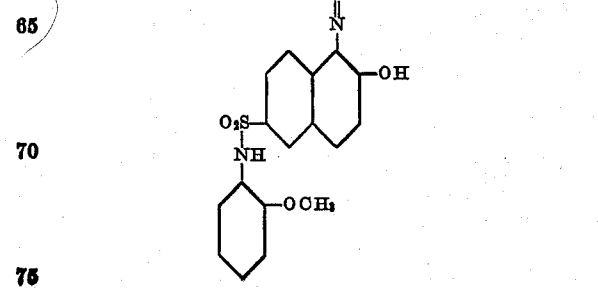

and dyes wool from an acid bath pure violet tints which when after-chromed become violet-brown tints which are fast to fulling.

Dyestuffs having similar properties are obtained by using, instead of 2-hydroxynaphthalene-6-sulfonic acid ortho-anisidide as an azo component, 2 - hydroxynaphthalene - 6 - sulfonic acid anilide or 2-hydroxynaphthalene-6-sulfonic acid diethyl amide.

Example 6

100 parts of well wetted wool are entered at 60° C. into a dyebath, which contains in 4000 parts of water 1 part of the dyestuff obtainable as described in the first paragraph of Example 1, 4 parts of acetic acid of 40 per cent strength and 10 parts of Glauber salt, the temperature is raised to the boil in the course of 30 minutes, and dyeing is carried on at the boil for 45 minutes. ½ part of sulfuric acid of 66° Bé. is then added, and dyeing is continued at the boil for 15 minutes. The dyebath is then cooled to about 70° C., 1 part of potassium bichromate is added, the whole is brought to the boil, and chroming is carried on for about 40 minutes at the boil. The whole is dyed a fast bluish bordeaux tint.

Example 7

A dyebath is prepared with 3 parts of a mixture consisting of 1.5 parts of potassium chromate and 1.5 parts of ammonium sulfate, 10 parts of Glauber salt and 1.5 parts of the dyestuff obtainable as described in the first paragraph of Example 3. 100 parts of well wetted wool are entered into the dyebath at 60° C., the temperature is raised to the boil in the course of 30 minutes, and boiling is continued for 45 minutes. 0.5 part of acetic acid of 40 per cent strength is then added and boiling is continued for a further 45 minutes. The wool is dyed a fast violet blue tint.

What we claim is:

1. A monoazo-dyestuff containing a single sulfonic acid group, being free from —COOH- groups and corresponding to the general formula

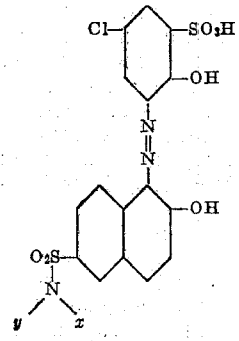

in which $x$ stands for a radical selected from the group consisting of mononuclear radicals of the benzene series and alkyl radicals containing up to five carbon atoms, and $y$ stands for a member selected from the group consisting of hydrogen and alkyl radicals containing up to five carbon atoms.

2. The monoazo-dyestuff of the formula

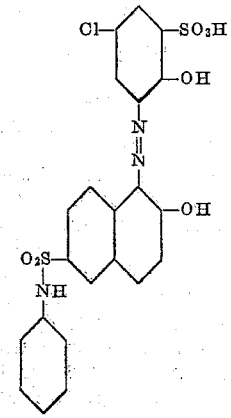

3. The monoazo-dyestuff of the formula

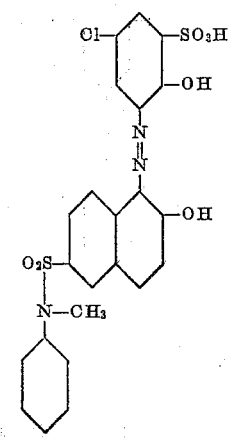

WILLY WIDMER.
EMIL MANNHART.

REFERENCES CITED

The following references are of record in the file of this patent:

UNITED STATES PATENTS

| Number | Name | Date |
|---|---|---|
| 1,128,813 | Neelmeir et al. | Feb. 16, 1915 |
| 1,728,998 | Krzikalla | Sept. 24, 1929 |
| 1,821,938 | Hentrich et al. | Sept. 8, 1931 |
| 1,918,002 | Straub et al. | July 11, 1933 |
| 2,033,341 | Krzikalla et al. | Mar. 10, 1936 |
| 2,086,854 | Crossley et al. | July 13, 1937 |
| 2,090,432 | Straub et al. | Aug. 17, 1937 |
| 2,122,127 | Benade | June 28, 1938 |
| 2,205,481 | Kracher et al. | June 25, 1940 |

FOREIGN PATENTS

| Number | Country | Date |
|---|---|---|
| 126,460 | Great Britain | May 9, 1919 |
| 115,470 | Switzerland | July 1, 1926 |